(12) United States Patent
Iriki

(10) Patent No.: US 11,953,474 B2
(45) Date of Patent: Apr. 9, 2024

(54) PREPARATIVE CHROMATOGRAPH

(71) Applicant: SHIMADZU CORPORATION, Kyoto (JP)

(72) Inventor: Takayuki Iriki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 421 days.

(21) Appl. No.: 17/312,465

(22) PCT Filed: Apr. 25, 2019

(86) PCT No.: PCT/JP2019/017714
§ 371 (c)(1),
(2) Date: Jun. 10, 2021

(87) PCT Pub. No.: WO2020/121547
PCT Pub. Date: Jun. 18, 2020

(65) Prior Publication Data
US 2022/0050086 A1    Feb. 17, 2022

Related U.S. Application Data

(60) Provisional application No. 62/779,195, filed on Dec. 13, 2018.

(51) Int. Cl.
*G01N 30/24*    (2006.01)
*G01N 30/02*    (2006.01)
(Continued)

(52) U.S. Cl.
CPC ............ *G01N 30/24* (2013.01); *G01N 30/32* (2013.01); *G01N 30/80* (2013.01);
(Continued)

(58) Field of Classification Search
None
See application file for complete search history.

(56) References Cited

U.S. PATENT DOCUMENTS

| 5,091,092 A * | 2/1992 | Newhouse | G01N 30/24 |
| | | | 73/864.22 |
| 2008/0229810 A1* | 9/2008 | Swart | G01N 30/88 |
| | | | 73/61.55 |

(Continued)

FOREIGN PATENT DOCUMENTS

WO    2016/194108 A1    12/2016

OTHER PUBLICATIONS

International Search Report for PCT/JP2019/017714 dated Jul. 30, 2019 [PCT/ISA/210].

(Continued)

*Primary Examiner* — Kristina M Deherrera
*Assistant Examiner* — Mark A Shabman
(74) *Attorney, Agent, or Firm* — Sughrue Mion, PLLC

(57) ABSTRACT

An injection valve switches between a first state in which a sample loop is connected to a separation flow path through which a mobile phase from a liquid sender flows and a second state in which the sample loop is disconnected from the separation flow path. A pump speed determiner, in a case where a sample intake operation by a syringe pump is started immediately after the injection valve is switched from the second state to the first state, and a filling operation of filling the sample loop with the sample by the syringe pump is started after the intake operation is completed, determines an intake operation speed of the syringe pump that is required in order for the filling operation to complete immediately before the injection valve is switched from the second state to the first state next time using a set injection interval time. The syringe pump operates at the intake operation speed determined by the pump speed determiner while performing the intake operation. The sample is injected by the injector at intervals of the set injection interval time.

3 Claims, 5 Drawing Sheets

(51) Int. Cl.
*G01N 30/32* (2006.01)
*G01N 30/80* (2006.01)

(52) U.S. Cl.
CPC . *G01N 2030/027* (2013.01); *G01N 2030/326* (2013.01); *G01N 2030/328* (2013.01)

(56) References Cited

U.S. PATENT DOCUMENTS

| | | | |
|---|---|---|---|
| 2014/0303903 A1* | 10/2014 | Fujita | H01J 49/0036 702/23 |
| 2016/0216239 A1* | 7/2016 | Aota | G01N 30/8651 |
| 2017/0234839 A1* | 8/2017 | Terada | G01N 30/46 73/61.55 |
| 2017/0343518 A1* | 11/2017 | Thielsch | G01N 30/22 |
| 2018/0136174 A1 | 5/2018 | Nakamura et al. | |

OTHER PUBLICATIONS

Written Opinion for PCT/JP2019/017714 dated Jul. 30, 2019 [PCT/ISA/237].

* cited by examiner

OPERATION OF FILLING SAMPLE LOOP WITH SAMPLE

PREPARATIVE CHROMATOGRAPH

CROSS REFERENCE TO RELATED APPLICATIONS

This application is a National Stage of International Application No. PCT/JP2019/017714 filed Apr. 25, 2019, claiming priority based on US Provisional Patent Application No. 62/779,195 filed Dec. 13, 2018.

TECHNICAL FIELD

The present invention relates to a preparative chromatograph such as a separation liquid chromatograph (also referred to as a separation LC) or a separation supercritical fluid chromatograph (also referred to as a separation SFC.)

BACKGROUND ART

A preparative chromatograph that separates a sample into components, purifies the components and collects the components in a separate container using a liquid chromatograph (LC) or a supercritical fluid chromatograph (SFC) has been known (see Patent Document 1.)

In a preparative chromatograph such as a separation LC or a separation SFC, stacked injection can be used in order to efficiently collect generated sample components. The stacked injection is a method of injecting a sample multiple times at preset time intervals. An sample injection interval time is set by a user based on a chromatogram acquired in advance in regard to a subject sample such that a peak of a component eluted last from a separation column among peaks of a component of a sample that is injected n-th does not overlap with a peak of a component that is eluted first from the separation column among component peaks of a sample that is injected n+1th. An injector of a preparative chromatograph system injects a sample multiple times at time intervals set by the user.

CITATION LIST

Patent Document

[Patent Document 1] WO2016/194108A1

SUMMARY OF INVENTION

Technical Problem

In the injector that injects a sample into a separation flow path in the preparative chromatograph, it is necessary to complete intake of a sample from a sample container and filling of a sample loop with a sample by a syringe pump in an interval time between injections of a sample into the separation flow path. In order to execute stacked injection correctly in a set injection interval time, a sufficiently fast operation speed of the syringe pump that allows a sample intake operation and a filling operation to complete in the set injection interval time is required.

Meanwhile, the sample injection interval time is dependent on a chromatogram of a sample, and an appropriate injection interval time differs depending on a sample. In a case where the syringe pump always operates at a constant speed, the operation speed of the syringe pump is required to be set to a speed that allows the sample intake operation and the filling operation to complete in a presumably shortest injection interval time. However, the higher the operating speed of the syringe pump is, the lower the accuracy of an amount of sample to be injected by the syringe pump is. Therefore, it is not desirable that the operation speed of the syringe pump is excessively high.

The present invention was conceived considering the above-mentioned problems, and an object of the present invention is to improve efficiency of collection of sample components by improving accuracy of an amount of a sample to be injected into a separation flow path by an injector.

Solution to Problem

A preparative chromatograph according to the present invention includes a liquid sender that sends a mobile phase, an injector that has a syringe pump for taking and discharging a sample, a sample loop for holding the sample temporarily and an injection valve that switches between a first state in which the sample loop is connected to a separation flow path through which a mobile phase from the liquid sender flows and a second state in which the sample loop is disconnected from the separation flow path, and injects the sample into the separation flow path by connecting the sample loop filled with the sample to the separation flow path, a separation column that is provided on the separation flow path and is to separate the sample that is injected into the separation flow path by the injector into components, a detector that is provided on the separation flow path and is to detect components generated by separation in the separation column, a fraction collector that is connected to a downstream end of the separation flow path and is to fractionate the components generated by separation in the separation column into a desired component and collect the desired component, an injection interval setter that is configured to set an injection interval time between injections of the sample into the separation flow path by the injector, a pump speed determiner, in a case where a sample intake operation by the syringe pump is started immediately after the injection valve is switched from the second state to the first state, and a filling operation of filling the sample loop with the sample by the syringe pump is started after the intake operation is completed, is configured to determine an intake operation speed of the syringe pump that is required in order for the filling operation to complete immediately before the injection valve is switched from the second state to the first state next time using the injection interval time set by the injection interval setter, and a controller configured to cause the injector to inject the sample at intervals of the injection interval time set by the injection interval setter by starting the sample intake operation by the syringe pump immediately after the injection valve is switched from the second state to the first state, starting the filling operation of filling the sample loop with the sample by the syringe pump after the intake operation is completed and causing the syringe pump to operate at the intake operation speed determined by the pump speed determiner in the intake operation.

The inventor of the present invention has obtained findings that a degree of reduction in accuracy of an amount of sample to be injected in a case where an intake operation speed of the syringe pump is increased is larger than a degree of reduction in accuracy of an amount of sample to be injected in a case where a filling operation speed is increased, and that it is important not to make the intake operation speed of the syringe pump be excessively high in order to ensure accuracy of an amount of sample to be injected by the syringe pump. Therefore, the preparative chromatograph according to the present invention is configured to determine (at least) the intake operation speed of the syringe pump based on a set injection interval time. The discharge operation speed of the syringe pump may also be determined based on the injection interval time or may be fixed at a certain speed.

Here, the injection interval time refers to a period of time from the time when the injection valve is switched from the second state to the first state to connect the sample loop holding a sample to the separation flow path until the time when the injection valve is switched from the second state to the first state next time.

Advantageous Effects of Invention

Because the preparative chromatograph according to the present invention is configured to determine an intake operation speed of the syringe pump at which the syringe pump performs a sample intake operation and a filling operation while making the most of an injection interval time, the sample intake operation is not performed at an excessively high speed. Thus, accuracy of an amount of sample to be injected by the injector is improved, and efficiency of collection of sample components is improved.

DESCRIPTION OF EMBODIMENTS

One embodiment of a preparative chromatograph will be described below with reference to the drawings.

Figure 1:
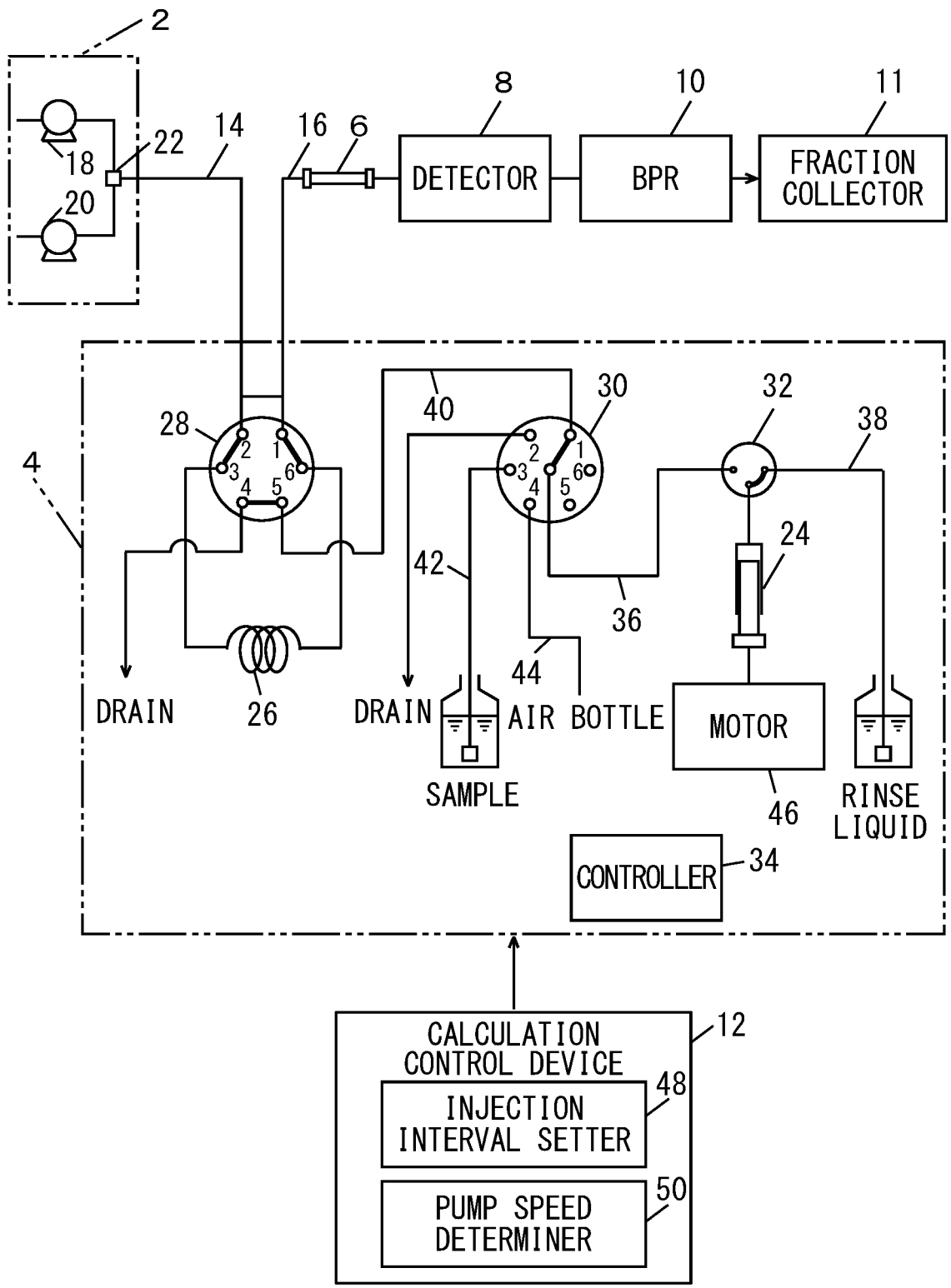
FIG. 1 A schematic diagram showing the configuration of a preparative chromatograph in one inventive example.

FIG. 1 is a schematic diagram showing the configuration of a separation SFC in one inventive example.

The separation SFC of this inventive example includes a liquid sender 2, an injector 4, a separation column 6, a detector 8, a back pressure regulator (BPR) 10, a fraction collector 11 and a calculation control device 12.

The liquid sender 2 includes a carbon dioxide pump 18 that sends a liquid carbon dioxide, a modifier pump 20 that sends a modifier and a mixer 22 for mixing a liquid carbon dioxide and a modifier. An outlet port of the mixer 22 is connected to a second port of an injection valve 28 of the injector 4, described below, through a mobile phase flow path 14.

The injector 4 includes a syringe pump 24, a sample loop 26, an injection valve 28, a sample valve 30, a syringe valve 32 and a controller 34.

The syringe pump 24 is driven by a motor 46. The syringe pump 24 is connected to one port of the syringe valve 32. A flow path 36 that leads to a common port of the sample valve 30 and a flow path 38 that leads to a rinse liquid bottle are connected to the other ports of the syringe valve 32, and the syringe pump 24 is switched to be connected to either one of the common port of the sample valve 30 and the rinse liquid bottle.

The injection valve 28 includes first to sixth ports in which two adjacent ports are configured to switch to be connected and disconnected. In the injection valve 28, a separation flow path 16 is connected to the first port, the mobile phase flow path 14 is connected to the second port, one end of the sample loop 26 is connected to the third port, a flow path that leads to a drain is connected to the fourth port, a flow path 40 that leads to the first port of the sample valve 30 is connected to the fifth port, and the other end of the sample loop 26 is connected to the sixth port. The injection valve 28 is switched to either one of a first state (the state of FIG. 1 and FIG. 2) in which the sample loop 26 is connected to the separation flow path 16 and a second state (the state of FIG. 3) in which the sample loop 26 is disconnected from the separation flow path 16. When the injection valve 28 is put in the first state, the mobile phase flow path 14, the sample loop 26 and the separation flow path 16 are connected in series in this order. On the other hand, when the injection valve 28 is put in the second state, the flow path 40, the sample loop 26 and the drain are connected in series in this order.

The sample valve 30 includes one common port and first to sixth selection ports and is configured to switch a connection destination of the common port among the selection ports and connect the common port to any one of the selection ports. The flow path 40 is connected to the first selection port, a flow path that leads to a drain is connected to the second selection port, a flow path 42 that leads to a sample container is connected to the third selection port, a flow path 44 that leads to an air bottle is connected to the fourth selection port, and a flow path is not connected to the fifth or sixth port.

The controller 34 is a function that is implemented by execution of a program in a computer circuit provided in the injector 4. The controller 34 is configured to control the operations of the injection valve 28, the sample valve 30, the syringe valve 32 and the motor 46 based on information supplied from the calculation control device 12.

The separation column 6, the detector 8 and the BPR 10 are provided on the separation flow path 16. The separation column 6 is to separate a sample, which is injected into the separation flow path 16 by the injector 4, into components. The detector 8 is to detect sample components generated by separation in the separation column 6. The BPR 10 is to maintain the pressure in the separation flow path 16 at a predetermined pressure (10 MPa, for example) in order to keep carbon dioxide in a mobile phase in a supercritical state.

The fraction collector 11 is provided at the downstream end of the separation flow path 16, and fractionates sample components that are generated by separation in the separation column 6 into a desired component to collect the desired component.

The calculation control device 12 is to manage the operation of this entire separation SFC and realized by a dedicated computer such as a system controller and/or a general personal computer. The calculation control device 12 includes an injection interval setter 48 and a pump speed determiner 50. The injection interval setter 48 and the pump speed determiner 50 are the functions implemented by execution of a program by a Central Processing Unit (CPU).

The injection interval setter 48 is configured to set a sample injection interval time in stacked injection that is to be executed by the injector 4 based on the information input by a user. That is, the user can set any period of time as an injection interval time.

Figure 4:
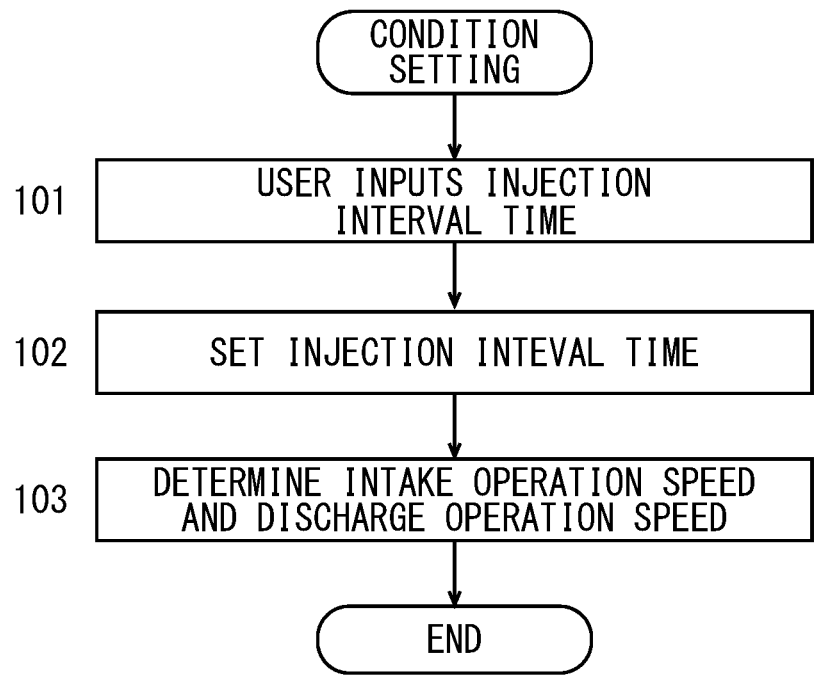
FIG. 4 A flowchart showing one example of an operation when a condition is set in the same inventive example.

The pump speed determiner 50 is configured to determine an intake operation speed and a discharge operation speed of the syringe pump 24 based on the injection interval time set by the injection interval setter 48. That is, as shown in the flowchart of FIG. 4, when the user inputs an injection interval time together with various operation conditions to the calculation control device 12 (step S101), the injection interval setter 48 sets the injection interval time (step S102), and an intake operation speed and a discharge operation speed of the syringe pump 24 are automatically set based on the injection interval time (step S103).

Figure 5:
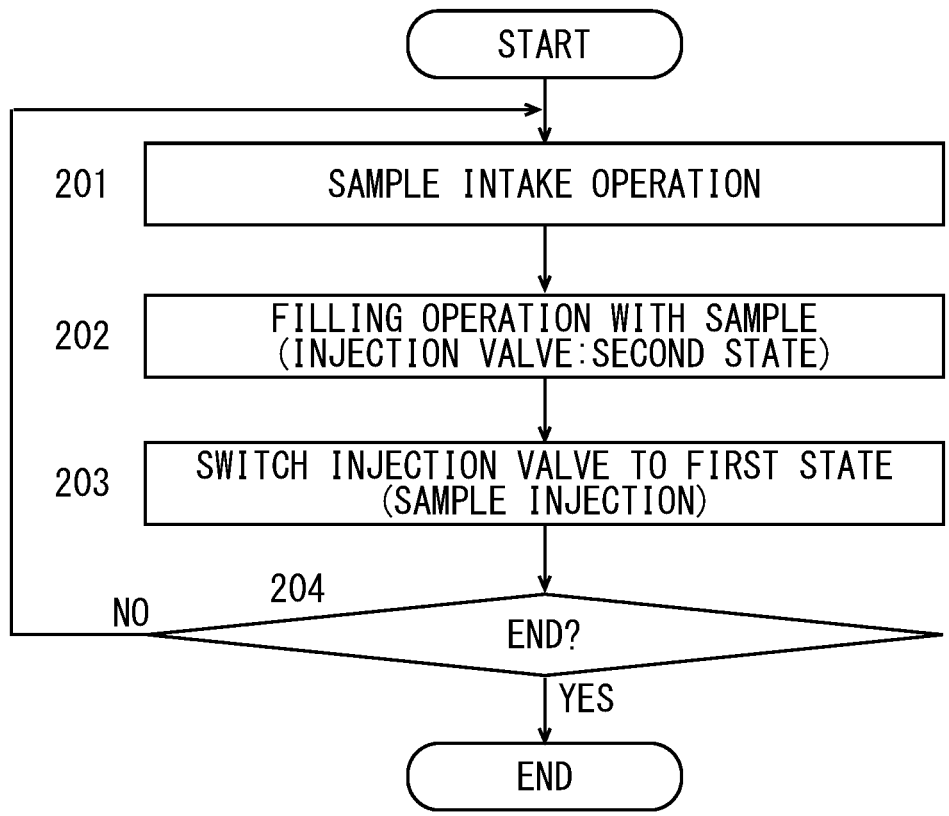
FIG. 5 A flowchart showing one example of a sample injection operation performed by an injector in the same inventive example.

Here, the stacked injection to be executed by the injector 4 will be described with reference to the flowchart of FIG. 5 as well as FIGS. 2 and 3.

Figure 2:
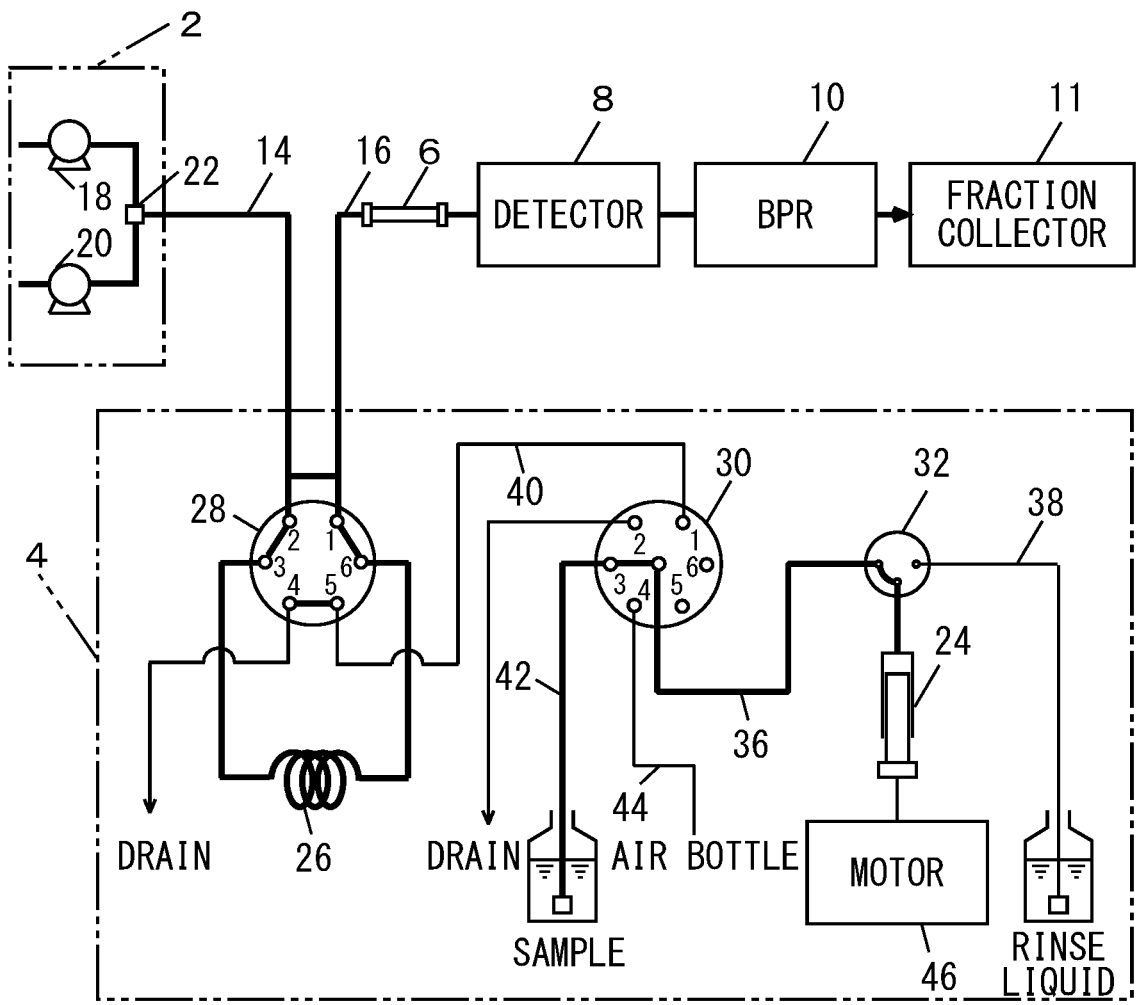
FIG. 2 A diagram showing the state of a flow path when a sample is taken by a syringe pump and when a sample is injected into a separation flow path by the syringe pump in the same inventive example.
Figure 3:
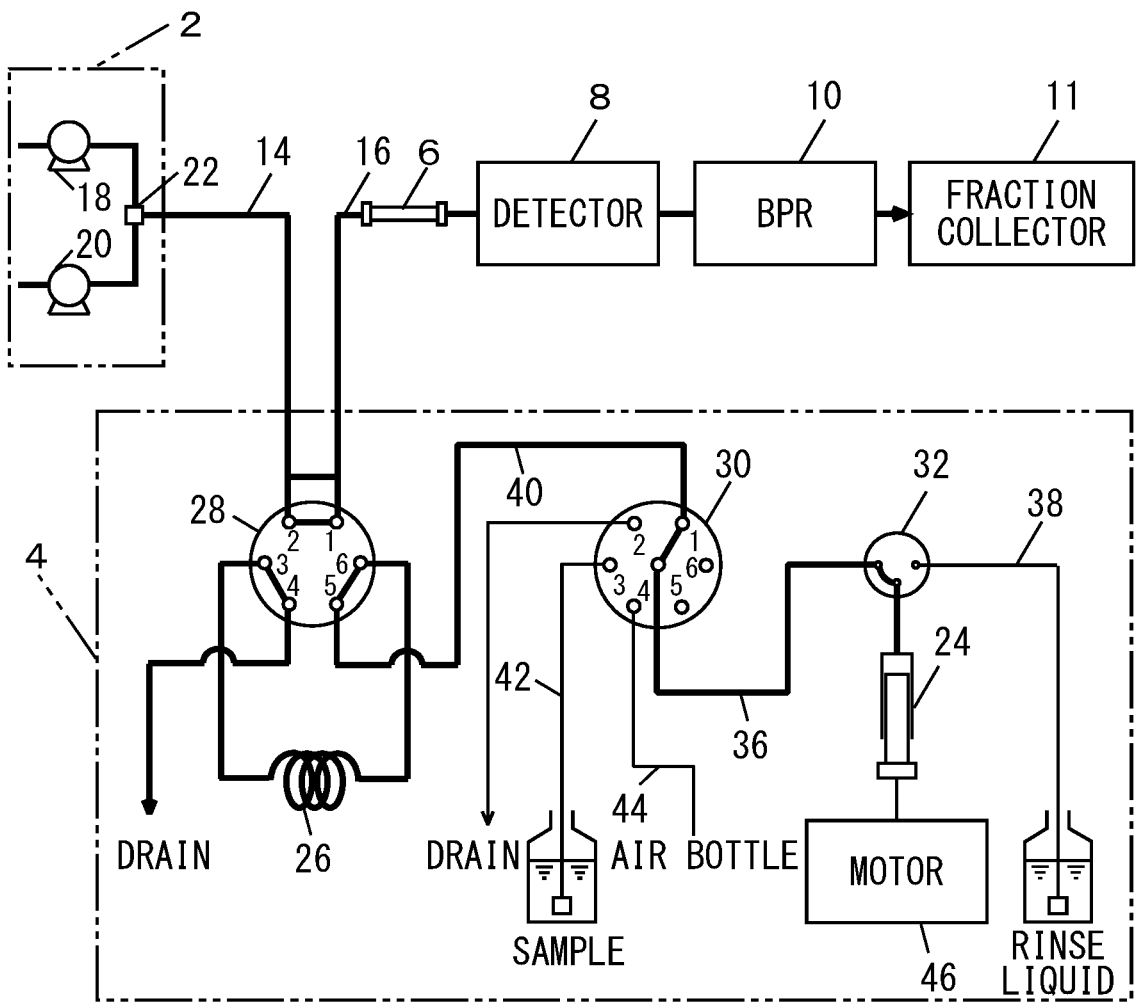
FIG. 3 A diagram showing the state of a flow path when a sample loop is filled with a sample in the same inventive example.

First, as shown in FIG. 2, the common port of the sample valve 30 is connected to the third selection port, and the syringe pump 24 performs an intake operation at a speed determined by the pump speed determiner 50 and takes a sample from the sample container (step S201). The injection valve 28 is switched to the second state by the time when the sample intake operation performed by the syringe pump 24 is completed. As shown in FIG. 3, when the sample intake operation is completed, the sample valve 30 is switched such that the common port is connected to the first selection port. Then, the syringe pump 24 performs a discharge operation at a speed determined by the pump speed determiner 50 to fill the sample loop 26 with a sample (step S202). After the operation of filling the sample loop 26 with a sample is completed, the injection valve 28 is switched to the first state as shown in FIG. 2, and the sample filling the sample loop 26 is injected into the separation flow path 16 (step S203).

The operation from the intake of the sample (step S201) to the injection of the sample into the separation flow path 16 (step S203) is repeatedly performed until the injection count reaches a preset count or until all of the sample in the sample container is injected into the separation flow path 16 (step 204). A sample injection interval time in the stacked injection refers to a period of time from the time when the injection valve 28 is switched from the second state to the first state, and the sample filling the sample loop 26 is injected into the separation flow path 16 until the time when the injection valve 28 is switched again from the second state to the first state, and the sample filling the sample loop 26 is injected again into the separation flow path 16.

The pump speed determiner 50 of the calculation control device 12 determines an intake operation speed and a discharge operation speed of the syringe pump 24 such that, in a case where a sample intake operation is started immediately after the injection valve 28 is switched from the second state to the first state, and the operation of filling the sample loop 26 with a sample is started immediately after the sample intake operation is completed, a period of time required for the filling operation to complete and for the injection valve 28 to be switched again to the first state from the start of the intake operation is an injection interval time set by the injection interval setter 48.

The controller 34 of the injector 4 is configured to execute a sample intake operation at a speed determined by the pump speed determiner 50 immediately after the injection valve 28 is switched from the second state to the first state and execute an operation of filling the sample loop 26 with the sample at a speed determined by the pump speed determiner 50 immediately after the sample intake operation is completed.

Figure 6:
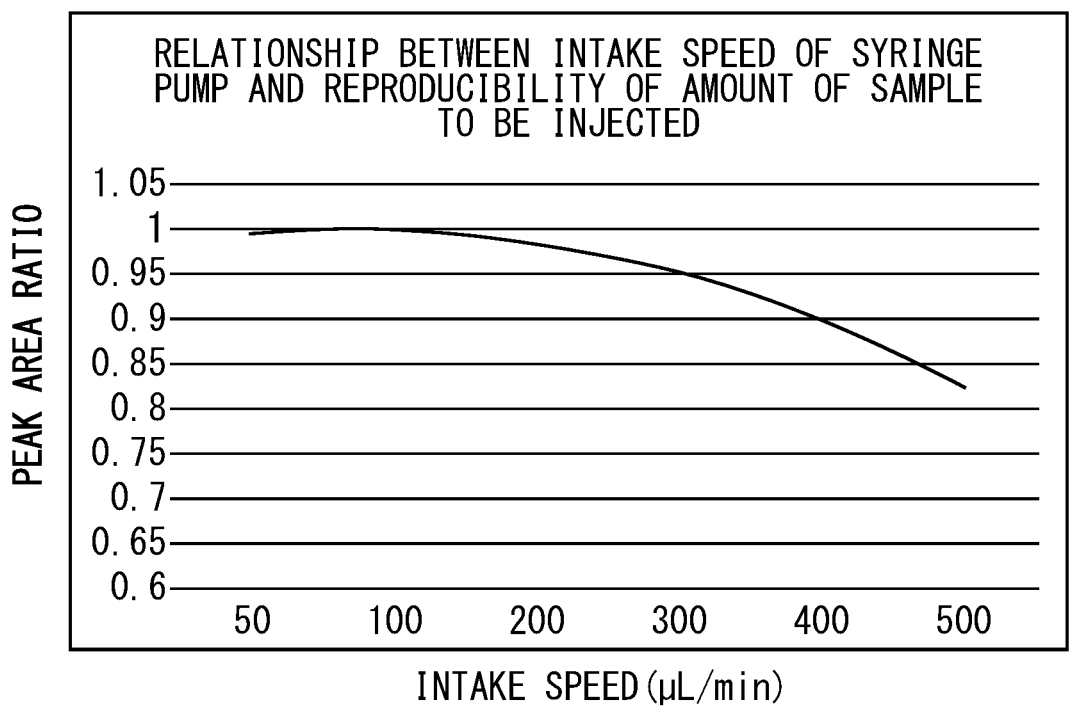
FIG. 6 A graph showing the relationship between an intake speed of the syringe pump and reproducibility of an amount of sample to be injected.
Figure 7:
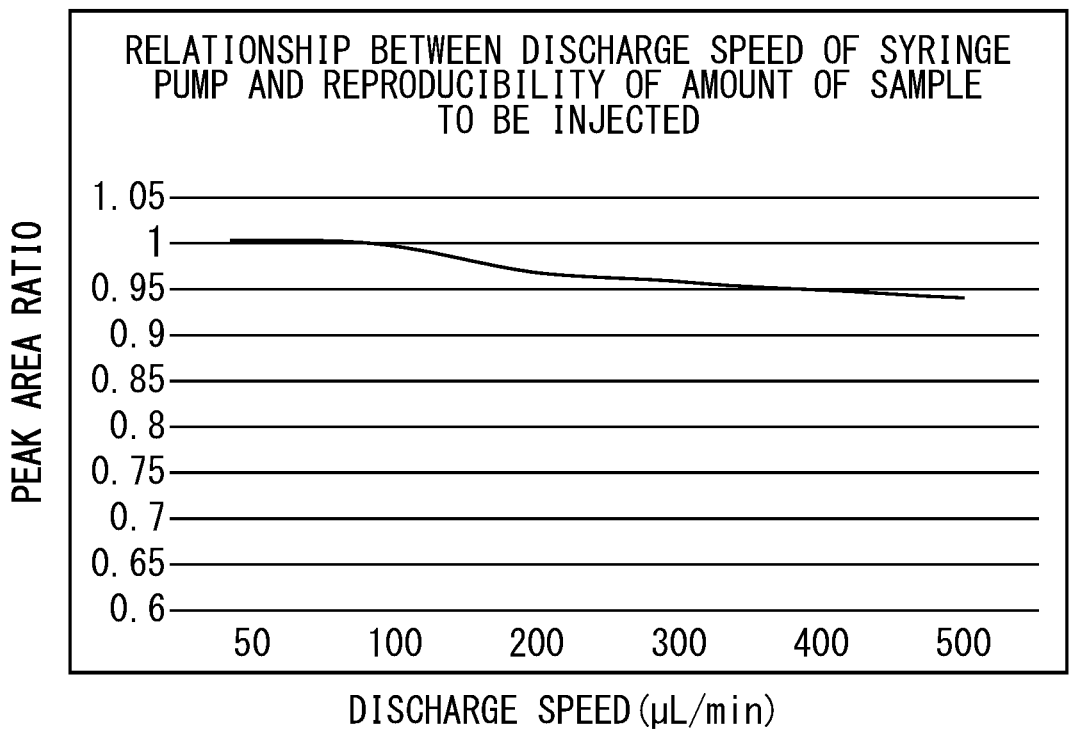
FIG. 7 A graph showing the relationship between a discharge speed of the syringe pump and reproducibility of an amount of sample to be injected.

The pump speed determiner 50 is not required to determine a discharge operation speed necessarily by calculation, and the discharge operation speed may be constant regardless of an injection interval time. FIGS. 6 and 7 are validation data relating to an influence an operating speed of the syringe pump 24 has on reproducibility of an amount of sample to be injected into the separation flow path 16. In the validation of FIG. 6, a discharge operation speed of the syringe pump 24 is constant at 50 µL/min, and a peak area ratio of a chromatogram that is acquired in a case where a sample is taken at various intake operation speeds and the sample is injected into the separation flow path 16 was obtained (a peak area value obtained in a case where an intake operation speed is 100 µL/min is set as 1 in calculation.) In the validation of FIG. 7, a discharge operation speed of the syringe pump 24 is constant at 50 µL/min, and a peak area ratio of a chromatogram that is acquired in a case where the sample loop 26 is filled with a sample at various discharge operation speeds and the sample is injected into the separation flow path 16 was obtained (a peak area value obtained in a case where a discharge operation speed is 100 µL/min is set as 1 in calculation.)

From the validation data of FIGS. 6 and 7, it is found that the higher an operation speed of the syringe pump 24 is, the lower reproducibility (a peak area ratio) of an amount of sample to be injected into the separation flow path 16 is. However, it is found that, in a case where an operation speed of the syringe pump 24 is equal to or higher than a certain speed, a degree of influence an intake operation speed has on reproducibility of an amount of sample to be injected is larger than a discharge operation speed. Therefore, an intake operation speed of the syringe pump 24 is desirably as slow as possible in order to ensure reproducibility of an amount of sample to be injected. Therefore, the pump speed determiner 50 may be configured to determine an intake operation speed of the syringe pump 24 to be lower than a discharge operation speed. The ratio between an intake operation speed and a discharge operation speed may be preset or may be obtained by calculation with use of data such as FIG. 6 and FIG. 7.

While the separation SFC is described above as the one inventive example of a preparative chromatograph, the present invention is not limited to this. The present invention can be applied to a separation LC similarly. The embodiment of the preparative chromatograph according to the present invention is as follows.

In an embodiment of a preparative chromatograph according to the present invention, the preparative chromatograph includes a liquid sender that sends a mobile phase, an injector that has a syringe pump for taking and discharging a sample, a sample loop for holding the sample temporarily and an injection valve that switches between a first state in which the sample loop is connected to a separation flow path through which a mobile phase from the liquid sender flows and a second state in which the sample loop is disconnected from the separation flow path, and injects the sample into the separation flow path by connecting the sample loop filled with the sample to the separation flow path, a separation column that is provided on the separation flow path and is to separate the sample that is injected into the separation flow path by the injector into components, a detector that is provided on the separation flow path and is to detect components generated by separation in the separation column, a fraction collector that is connected to a downstream end of the separation flow path and is to fractionate the components generated by separation in the separation column into a desired component and collect the desired component, an injection interval setter that is configured to set an injection interval time between injections of the sample into the separation flow path by the injector, a pump speed determiner, in a case where a sample intake operation by the syringe pump is started immediately after the injection valve is switched from the second state to the first state, and a filling operation of filling the sample loop with the sample by the syringe pump is started after the intake operation is completed, is configured to determine an intake operation speed of the syringe pump that is required in order for the filling operation to complete immediately before the injection valve is switched from the second state to the first state next time using the injection interval time set by the injection interval setter, and a controller configured to cause the injector to inject the sample at intervals of the injection interval time set by the injection interval setter by starting the sample intake operation by the syringe pump immediately after the injection valve is switched from the second state to the first state, starting the filling operation of filling the sample loop with the sample by the syringe pump after the intake operation is completed and causing the syringe pump to operate at the intake operation speed determined by the pump speed determiner in the intake operation.

In the above-mentioned embodiment, the pump speed determiner is configured to determine the intake operation speed and the discharge operation speed of the syringe pump, and the controller may be configured to cause the syringe pump to operate at the discharge operation speed determined by the pump speed determiner in the filling operation. With such an aspect, the operation speed of the syringe pump can be adjusted more flexibly, and accuracy of an amount of sample to be injected can be improved more sufficiently.

Further, the pump speed determiner may be configured to determine an intake operation speed of the syringe pump to be lower than a discharge operation speed. Because an influence an intake operation speed has on reproducibility of an amount of sample to be injected is larger than a discharge operation speed out of operation speeds, it is possible to enhance reproducibility of an amount of sample to be injected by making the intake operation speed be lower than the discharge operation speed.

REFERENCE SIGNS LIST

2 Liquid sender
4 Injector
6 Separation column
8 Detector
10 BPR
11 Fraction collector
12 Calculation control device
14 Mobile phase flow path
16 Separation flow path
18 Carbon dioxide pump
20 Modifier pump
22 Mixer
24 Syringe pump
26 Sample loop
28 Injection valve
30 Sample valve
32 Syringe valve
34 Controller
36, 38, 40, 42, 44 Flow paths
46 Motor
48 Injection interval setter
50 Pump speed determiner

The invention claimed is:

1. A preparative chromatograph comprising:
a liquid sender that sends a mobile phase;
an injector that has a syringe pump for taking and discharging a sample, a sample loop for holding the sample temporarily and an injection valve that switches between a first state in which the sample loop is connected to a separation flow path through which a mobile phase from the liquid sender flows and a second state in which the sample loop is disconnected from the separation flow path, and injects the sample into the separation flow path by connecting the sample loop filled with the sample to the separation flow path;
a separation column that is provided on the separation flow path and is to separate the sample that is injected into the separation flow path by the injector into components;
a detector that is provided on the separation flow path and is to detect components generated by separation in the separation column;
a fraction collector that is connected to a downstream end of the separation flow path and is to fractionate the components generated by separation in the separation column into a desired component and collect the desired component;
an injection interval setter that is configured to set an injection interval time between injections of the sample into the separation flow path by the injector;
a pump speed determiner, in a case where a sample intake operation by the syringe pump is started after the injection valve is switched from the second state to the first state, and a filling operation of filling the sample loop with the sample by the syringe pump is started after the intake operation is completed, is configured to determine an intake operation speed of the syringe pump that is required in order for the filling operation to complete before the injection valve is switched from the second state to the first state using the injection interval time set by the injection interval setter; and
a controller configured to cause the injector to inject the sample at intervals of the injection interval time set by the injection interval setter by starting the sample intake operation by the syringe pump after the injection valve is switched from the second state to the first state, starting the filling operation of filling the sample loop with the sample by the syringe pump after the intake operation is completed and causing the syringe pump to operate at the intake operation speed determined by the pump speed determiner in the intake operation.

2. The preparative chromatograph according to claim 1, wherein:
the pump speed determiner is configured to determine the intake operation speed and a discharge operation speed of the syringe pump, and
the controller is configured to cause the syringe pump to operate at the discharge operation speed determined by the pump speed determiner in the filling operation.

3. The preparative chromatograph according to claim 2, wherein:

the intake operation speed of the syringe pump is lower than the discharge operation speed.

* * * * *